United States Patent
Dulmes et al.

(10) Patent No.: US 12,454,845 B2
(45) Date of Patent: Oct. 28, 2025

(54) HANDLE ASSEMBLY FOR A SHOWER DOOR

(71) Applicant: KOHLER CO., Kohler, WI (US)

(72) Inventors: Jacob Dulmes, Belgium, WI (US); Drew Vettel, Sheboygan Falls, WI (US); Calvin Doornbos, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 18/362,208

(22) Filed: Jul. 31, 2023

(65) Prior Publication Data

US 2023/0374818 A1    Nov. 23, 2023

Related U.S. Application Data

(63) Continuation of application No. 17/525,776, filed on Nov. 12, 2021, now Pat. No. 11,719,019.

(60) Provisional application No. 63/119,757, filed on Dec. 1, 2020.

(51) Int. Cl.
*E05B 1/00* (2006.01)
*A47K 3/36* (2006.01)

(52) U.S. Cl.
CPC .............. *E05B 1/0015* (2013.01); *A47K 3/36* (2013.01)

(58) Field of Classification Search
CPC ........... E05B 1/0015; E05B 1/00; A47K 3/34; A47K 3/36
See application file for complete search history.

(56) References Cited

U.S. PATENT DOCUMENTS

| | | | | |
|---|---|---|---|---|
| 305,140 | A | * 9/1884 | Bradley | ................... F16B 7/20 279/93 |
| 402,132 | A | * 4/1889 | Berry | ........................ F16B 7/20 285/376 |
| 1,654,550 | A | 1/1928 | Muend | |
| 1,665,436 | A | 4/1928 | Bloch | |
| 1,932,099 | A | * 10/1933 | Cabana | ................. A47L 13/252 403/349 |
| 2,076,918 | A | * 4/1937 | Robison | ................ F16L 37/248 285/82 |
| 2,593,677 | A | 4/1952 | Jakeway | |

(Continued)

FOREIGN PATENT DOCUMENTS

| CN | 203145574 U | 8/2013 |
|---|---|---|
| CN | 205577618 U | 9/2016 |

(Continued)

OTHER PUBLICATIONS amazon.com, "PULSE ShowerSpas 3001-RIV-PB-BN Tru-Temp Mixing Valve, Pressure Balance Rough-In Valve Trim Kit, Round, ½" NPT, Brushed Nickel", Internet URL: https://www.amazon.com/PULSE-ShowerSpas-3001-RIV-PB-BN-Tru-Temp-Pressure/dp/B014XGO15G/ref=sr_1_2?crid=2QGREI94V6IAL&keywords=pulse%2Btru%2Btemp%2Bpressure%2Bbalanced%2Bvalve%2Btrim&qid=1691767713&sprefix=pulse%2Btru%2Btemp%2Bpressure%2Bbalanced%2Bvalve%2Btri%2Caps%2C122&sr=8-2&th=1, First Available Sep. 1, 2015.

(Continued)

*Primary Examiner* — William L Miller
(74) *Attorney, Agent, or Firm* — FOLEY & LARDNER LLP (57) ABSTRACT

A handle assembly for a shower door, which includes a handle, a fastener having a shank, a head, and a post. The handle includes a receiver having a keyway and the post (Continued)

extends radially away from the shank and is configured to be received by the keyway.

18 Claims, 5 Drawing Sheets

(56) References Cited

U.S. PATENT DOCUMENTS

| | | | | |
|---|---|---|---|---|
| 2,807,827 | A * | 10/1957 | Brooks | E05B 1/0015 16/419 |
| 2,820,655 | A * | 1/1958 | Hileman | F16B 7/20 403/349 |
| 3,082,473 | A * | 3/1963 | West | A45C 13/26 16/445 |
| 3,311,943 | A * | 4/1967 | Budai | A47B 95/02 16/419 |
| 3,593,550 | A | 7/1971 | Berkowitz | |
| 3,829,139 | A | 8/1974 | Storlie | |
| 4,912,809 | A * | 4/1990 | Scheuer | F16B 9/058 16/443 |
| 5,026,013 | A * | 6/1991 | Robbins | F16B 9/052 D8/352 |
| 5,071,099 | A * | 12/1991 | Kuo | A47K 10/10 248/224.7 |
| 5,186,197 | A * | 2/1993 | Lavine | A45B 19/00 135/25.4 |
| 5,887,927 | A * | 3/1999 | Kurek, III | H05K 5/023 16/415 |
| 6,113,045 | A * | 9/2000 | Kuo | A47K 10/10 248/224.7 |
| 6,250,044 | B1 * | 6/2001 | Funk | A47K 10/10 211/119.009 |
| 6,343,808 | B1 * | 2/2002 | Luh | B60D 1/06 403/322.2 |
| 6,581,245 | B2 * | 6/2003 | Jen | E05B 1/0015 16/334 |
| 6,651,830 | B2 * | 11/2003 | Pan | A47K 10/10 248/251 |
| 6,796,442 | B1 * | 9/2004 | Wu | A47K 10/04 248/251 |
| 6,925,686 | B2 * | 8/2005 | Heathcock | B25G 1/04 16/427 |
| 6,959,480 | B2 | 11/2005 | Wing et al. | |
| 6,966,101 | B2 | 11/2005 | Chiang | |
| 7,077,150 | B2 | 7/2006 | McNerney | |
| 7,367,535 | B2 * | 5/2008 | Lai | A47K 10/10 D6/524 |
| 7,509,971 | B2 | 3/2009 | Kajuch | |
| 7,926,772 | B2 * | 4/2011 | Lowe | A47K 10/10 248/220.21 |
| 7,942,161 | B2 | 5/2011 | Crompton | |
| 8,176,934 | B2 | 5/2012 | Niver | |
| 8,439,593 | B2 * | 5/2013 | Slater | A61F 2/4684 403/348 |
| 8,459,920 | B2 * | 6/2013 | Selle | F16B 5/0628 411/509 |
| 9,062,796 | B2 | 6/2015 | Horsman et al. | |
| 9,328,488 | B2 | 5/2016 | Van Leyen et al. | |
| 9,410,660 | B2 * | 8/2016 | Zimmerman | A47K 10/10 |
| 9,725,889 | B2 | 8/2017 | Wilson et al. | |
| 9,909,287 | B2 | 3/2018 | Van Leyen et al. | |
| 10,174,532 | B2 * | 1/2019 | Couturier | E05C 19/184 |
| 11,746,561 | B2 * | 9/2023 | Simon | E05B 1/0015 16/412 |
| 11,781,296 | B2 | 10/2023 | Stokes et al. | |
| 12,139,932 | B2 * | 11/2024 | Bennett | E05B 1/0015 |
| 12,152,406 | B2 * | 11/2024 | Odom | E05B 1/0015 |
| 2002/0104946 | A1 * | 8/2002 | Lai | A47K 10/04 248/224.7 |
| 2005/0034381 | A1 * | 2/2005 | Bartmann | F24C 15/023 52/79.1 |
| 2005/0063772 | A1 * | 3/2005 | Bladen | E03C 1/021 403/348 |
| 2006/0032025 | A1 * | 2/2006 | Hendrickson | E05B 1/0015 16/444 |
| 2006/0043039 | A1 * | 3/2006 | Garrett | A47K 10/10 211/105.1 |
| 2006/0175496 | A1 * | 8/2006 | Lai | A47K 10/10 248/251 |
| 2009/0242713 | A1 * | 10/2009 | Lowe | A47K 10/38 248/222.13 |
| 2010/0132810 | A1 | 6/2010 | Pompian | |
| 2011/0110716 | A1 * | 5/2011 | Slater | F16B 21/04 403/348 |
| 2012/0005822 | A1 * | 1/2012 | Daubmann | A47K 10/10 4/607 |
| 2012/0145854 | A1 * | 6/2012 | Smith | A47K 10/10 248/231.91 |
| 2014/0007381 | A1 * | 1/2014 | Huang | A47B 95/02 16/421 |
| 2014/0159392 | A1 * | 6/2014 | Tsai | E05B 63/16 292/336.3 |
| 2015/0128383 | A1 * | 5/2015 | Ryan | A44B 1/14 24/106 |
| 2015/0152975 | A1 | 6/2015 | Jonte | |
| 2016/0135550 | A1 * | 5/2016 | Drage | A44C 3/001 24/453 |
| 2019/0017624 | A1 | 1/2019 | Du et al. | |
| 2020/0088317 | A1 | 3/2020 | Bai et al. | |
| 2020/0102724 | A1 | 4/2020 | Rosko | |
| 2021/0214966 | A1 * | 7/2021 | Odom | E05B 1/0015 |
| 2021/0324658 | A1 * | 10/2021 | Cronin | A61L 2/238 |
| 2021/0363779 | A1 * | 11/2021 | Bennett | E05B 1/0015 |
| 2022/0170292 | A1 * | 6/2022 | Dulmes | A47K 3/34 |

FOREIGN PATENT DOCUMENTS

| | | |
|---|---|---|
| CN | 208518454 U | 2/2019 |
| EP | 0 463 398 B1 | 1/1992 |
| GB | 0 623 461 | 5/1949 |
| GB | 0 895 532 | 5/1962 |
| KR | 19990033474 | 8/1999 |

OTHER PUBLICATIONS amazon.com, "Zurn Z7300-SS-MT Tub And Shower Valve", Internet URL: https://www.amazon.com/Zurn-Z7300-SS-MT-Tub-Shower-Valve/dp/B001P1ZJX6/ref=sr_1_16_sspa?crid=2QGREI94V6IAL&keywords=pulse tru temp pressure balanced valve trim&qid=1691767713&sprefix=pulse tru temp pressure balanced valve tri%2Caps%2C122&sr=8-16-spons&sp_csd=d2lkZ2VOTmFtZT1zcF9tdGY&psc=1, First Available Sep. 9, 2009.

Floor Anchors, PYI Inc., retrieved on Nov. 11, 2021 from https://www.pyiinc.com/floor-anchors.html.

* cited by examiner

HANDLE ASSEMBLY FOR A SHOWER DOOR

CROSS-REFERENCE TO RELATED APPLICATIONS

This application is a continuation of U.S. patent application Ser. No. 17/525,776, filed on Nov. 12, 2021, which claims the benefit and priority to U.S. Provisional Application No. 63/119,757, filed Dec. 1, 2020, which is incorporated herein by reference in its entirety.

BACKGROUND

The present disclosure relates generally to shower door handles. More specifically, the present disclosure relates to fastening assemblies and methods for shower door handles.

SUMMARY

One aspect of the resent disclosure relates to a handle assembly for a shower door. The handle assembly includes a handle including a receiver having a keyway, a fastener having a shank, a head, and a post. The post extends radially away from the shank and is configured to be received by the keyway.

In various embodiments, the handle assembly further includes a biasing member positioned within the receiver and configured to interface with an end of the fastener. In some embodiments, the biasing member is at least one of a spring, a piston, or a rubber stop. In other embodiments, the handle assembly also includes a first washer positioned between the handle and a substrate to prevent contact between the handle and the substrate. In yet other embodiments, the handle assembly includes a second washer positioned between the head of the fastener and the substrate to prevent contact between the head of the fastener and the substrate. In various embodiments, the first washer is formed of a polymer. In some embodiments, the handle includes a handle body, a first boss, and a second boss, where the first boss and the second boss extend orthogonally away from the handle body, and where the first boss and the second boss are separated by a distance. In other embodiments, the first boss defines a sole, which is substantially parallel to the shower door. In yet other embodiments, the receiver extends away from the sole. In various embodiments, the receiver is countersunk below the sole such that no portion of the receiver extends above the sole.

Another aspect of the present disclosure relates to a door assembly for a shower. The door assembly includes a substrate having an aperture, a handle including a receiver having a keyway, and a fastener. The fastener includes a shank, a head, and a post. The post extends radially away from the shank and is configured to be received by the keyway.

In various embodiments, the post extends radially from the shank. In some embodiments, when the handle is coupled to the substrate, the receiver extends through the aperture. In other embodiments, the door assembly further includes a first washer positioned between the handle and a substrate to prevent contact between the handle and the substrate, and a spacer positioned between the head of the fastener and the substrate to prevent contact between the head of the fastener and the substrate. In yet other embodiments, the spacer includes a first portion and a second portion, the first portion defining an annular body, and the second portion extending away from the first portion and into the aperture. In various embodiments, a central opening of the second portion of the spacer has a frustoconical cross-section. In some embodiments, the receiver extends into the aperture of the substrate. In some embodiments, the keyway includes a keyway entry and a keyway cavity connected to the keyway entry. In other embodiments, the post is positioned within the keyway cavity when the post is received within the keyway. In some embodiments, the handle includes a handle body, a first boss, and a second boss, where the first boss and the second boss extend orthogonally away from the handle body and where the first boss and the second boss are separated by a distance.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a door assembly for a shower is provided. Shower doors are often glass or acrylic and allow access into a shower enclosure. In some embodiments, the shower door is hinged and is able to swing into or out of the shower enclosure. In some embodiments, the shower door is a sliding door that slides back and forth. For both sliding doors and hinged doors, a user may interface with a handle to open and close the door. These handles are typically fixed to the door using fasteners that require special tools to remove, which can be time consuming and complicated for a user to perform. Thus, it would be advantageous to provide a door handle that can be coupled to, and removed from, a shower door in a quick-release manner without the need for special tools or time consuming processes.

Figure 1:
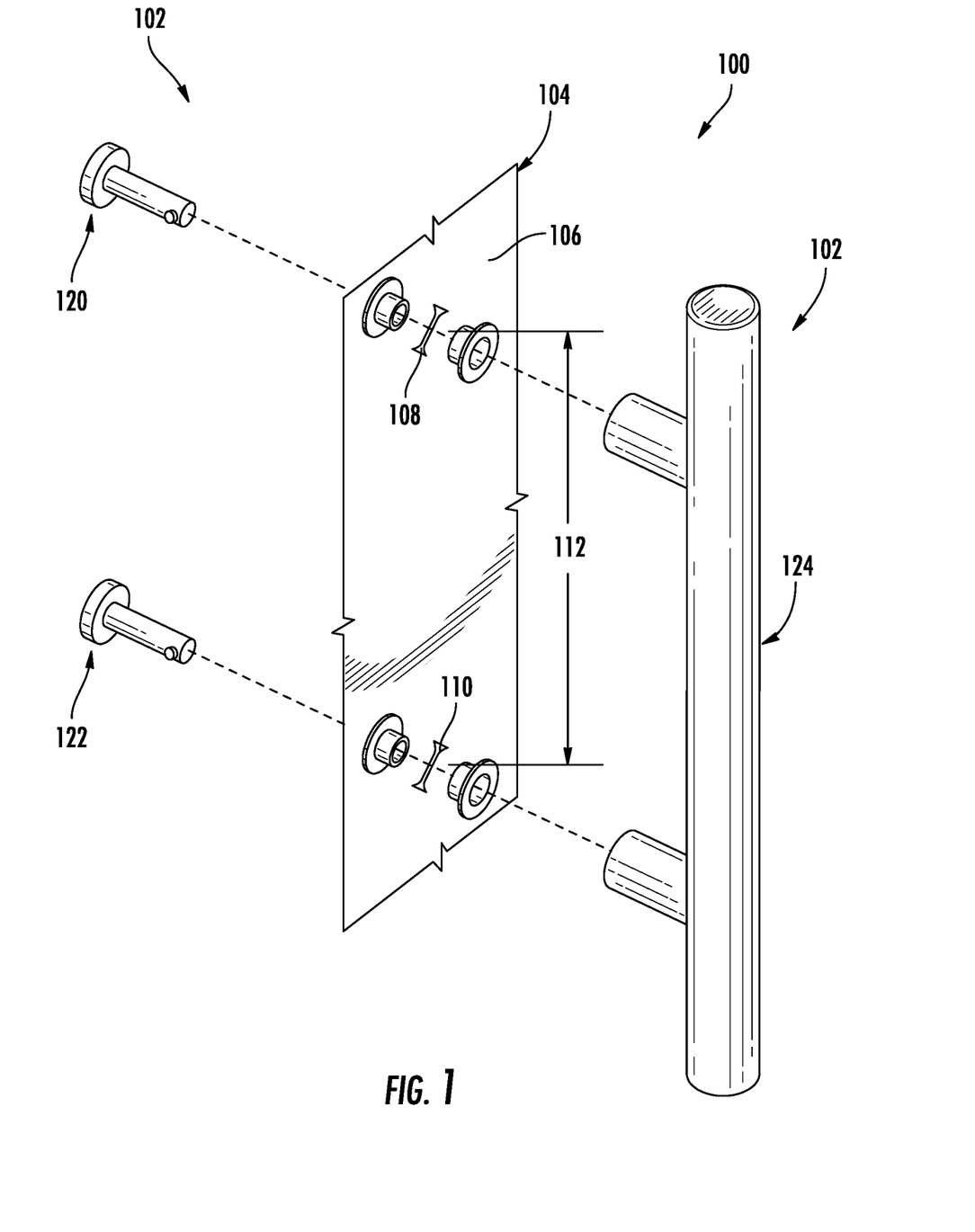
FIG. 1 is an exploded, perspective view of a handle assembly for a shower door, according to an example embodiment.

Referring to FIG. 1, an exploded, perspective view of a door assembly 100 is shown, according to an exemplary embodiment. The door assembly 100 includes a handle assembly 102 and a door 104. The door 104 is a shower door for selectively closing off a shower enclosure (e.g., shower environment). According to other embodiments, the door 104 may be a door for a building, a closet door, a cabinet door, or any other type of door that can be manually pivoted and/or translated by a user. The door 104 may take a variety of shapes, including a rectangle, rounded rectangle, curved, flat, obround, winged, or any other polygon shape. The door 104 may be substantially planar or substantially non-planar or include substantially planar or non-planar portions. The door 104 is formed of a substrate 106, such as acrylic or glass. In some embodiments, the substrate 106 is metal, wood, polymeric material, or any other type of material or combinations of materials that are configured to maintain a door shape.

The substrate 106 is configured for coupling with the handle assembly 102. The substrate 106 may include a first hole 108 (e.g., orifice, aperture, etc.) configured to receive a portion of the handle assembly 102 to couple the handle assembly 102 to the substrate 106. In some embodiments, the substrate 106 includes the first hole 108 and a second hole 110 for coupling with the handle assembly 102. The first hole 108 and the second hole 110 may be circular. For example, the first hole 108 and the second hole 110 may be cut into the substrate 106 using a drill bit, a circle glass cutter, or a similar cutting tool. The first hole 108 and the second hole 110 are distanced apart from one another by a first distance 112. In some embodiments, the first hole 108 and the second hole 110 are vertically centered relative to one another such that when the door 104 is properly hung proximate to the shower enclosure, the first hole 108 is positioned vertically in line with the second hole 110. In some embodiments, the first hole 108 and the second hole 110 are positioned horizontally relative to one another such that the first hole 108 and the second hole 110 are positioned at the same vertical height when the door 104 is hung proximate to the shower enclosure. As should be appreciated from FIG. 1, the handle assembly 102 and the preferences of the user will determine the positions of the first hole 108 and the second hole 110. For example, the user may prefer the handle assembly 102 be positioned diagonally, and thus the first hole 108 and the second hole 110 may be positioned diagonally relative to each other.

The handle assembly 102 includes a first fastener 120, a second fastener 122, and a handle 124. The first fastener 120 is configured to extend at least partially through the first hole 108 and couple with the handle 124. Similarly, the second fastener 122 is configured to extend at least partially through the second hole 110 and couple with the handle 124. In some embodiments, the first fastener 120 and the second fastener 122 form a bayonet coupling with the handle 124. In some embodiments, the first fastener 120 is coupled to the handle 124 with a quarter-turn. In other words, the first fastener 120 may be a quarter-turn fastener. Similarly, the second fastener 122 may be a quarter-turn fastener configured to be coupled to the handle 124 with a quarter turn. According to other embodiments, the first fastener 120 and/or the second fastener 122 may be able to couple to the handle 124 by other rotational angles, such as a ⅛ turn, a 180 degree turn (e.g., half-turn), or a full 360 degree turn.

Figure 2:
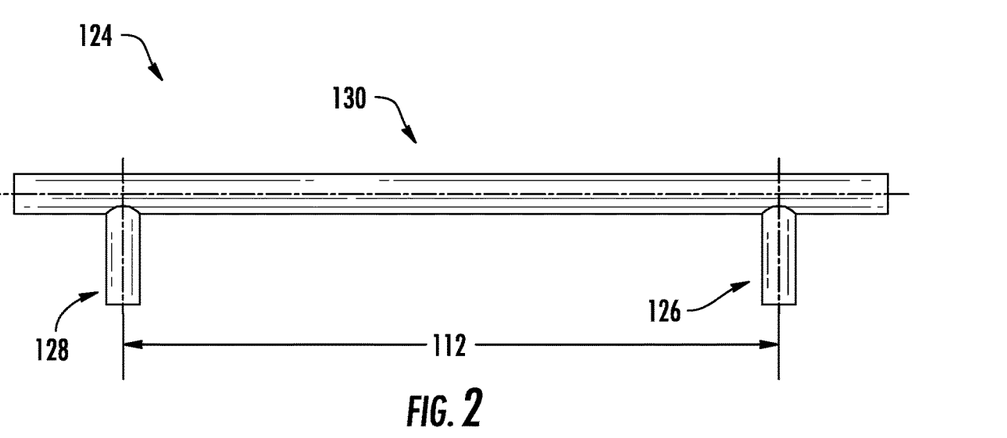
FIG. 2 is side view of a handle of the handle assembly of FIG. 1.
Figure 3:
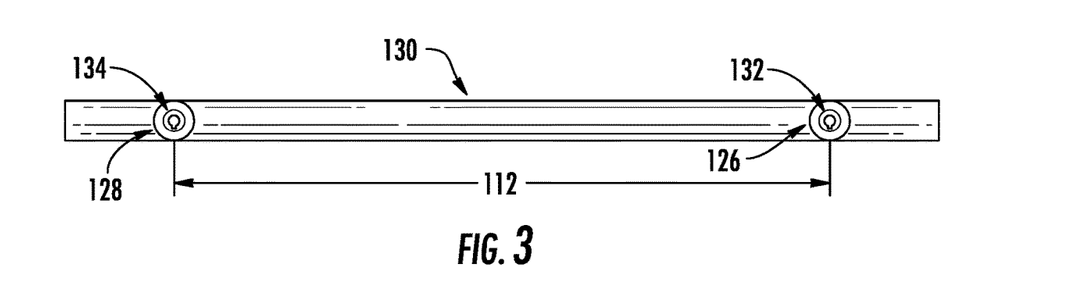
FIG. 3 is a bottom view of the handle of FIG. 2.
Figure 4:
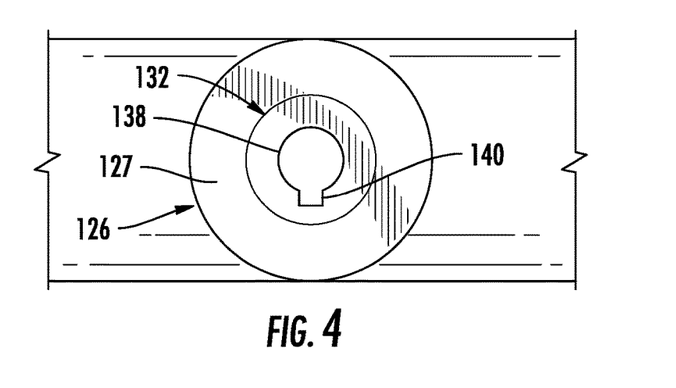
FIG. 4 is a detailed bottom view of the handle of FIG. 2.

Referring now to FIGS. 2-4, the handle 124 is shown according to an exemplary embodiment. The handle 124 includes a first boss 126, a second boss 128, and a handle body 130. The handle body 130 defines a substantially cylindrical member that extends between and is coupled to both the first boss 126 and the second boss 128. In some embodiments, the handle body 130 defines a wavy or curved body having gripping features. In some embodiments, the handle body 130 defines a cross-sectional shape having sharp corners, such as a rectangle, pentagon, hexagon, octagon, and similar polygons. In some embodiments, the handle body 130 defines a rectangular prism. The first boss 126 and the second boss 128 may define a cross-section substantially similar to the cross-section of the handle body 130. In some embodiments, the first boss 126 and the second boss 128 define cross-sectional shapes different from the cross-section of the handle body 130. The first boss 126 extends radially away from the handle body 130 in a direction substantially orthogonal to the handle body 130. Similarly, the second boss 128 extends radially away from the handle body 130 in a direction similar to the direction of the first boss 126. The first boss 126 and the second boss 128 are separated by the first distance 112.

Referring now to FIG. 3, a bottom view of the handle 124 is shown. A first receiver 132 is positioned within the first boss 126 and is concentric with a central axis of the first boss 126. The first receiver 132 is configured to receive the first fastener 120 and be coupled with the first fastener 120. The first receiver 132 may be manufactured separately from the first boss 126 and later coupled to the first boss 126. For example, a hole may be drilled in the first boss 126, and the first receiver 132 may be coupled within the hole via epoxy, adhesives, fasteners, or the like. For example, the first receiver 132 may include a threaded portion that threads into a hole drilled out of the first boss 126. In some embodiments, the first receiver 132 is integral with the first boss 126 such that the first receiver 132 and the first boss 126 are formed of a single body. Similarly, a second receiver 134 is positioned within the second boss 128 and is concentric with a central axis of the second boss 128. The second receiver 134 is configured to receive and be coupled with the second fastener 122.

Referring now to FIG. 4, a detailed bottom view of the first boss 126 is shown. The first boss 126 defines a surface, shown as a sole 127 (e.g., first surface). The sole 127 may be defined as a terminal end of the boss 126 that includes a surface that abuts or otherwise may interface with the substrate 106 and/or with any spacers (e.g., washers, gaskets, etc.) disposed therebetween. When the handle 124 is coupled to the door 104, the sole 127 is substantially parallel to the substrate 106. A first aperture 138 and a first keyway 140 extend into the first receiver 132. The first aperture 138 and the first keyway 140 are configured to receive the first fastener 120. In some embodiments, the first aperture 138 and the first keyway 140 are formed within the first boss 126. For example, the first boss 126 may not include the first receiver 132, but instead the first aperture 138 and the first keyway 140 are machined into the first boss 126. The first aperture 138 may be machined using a drill press, mill, lathe, or similar cutting tool. The first keyway 140 may be machined using a shaper, lathe, mill, or similar cutting tool.

Figure 5:
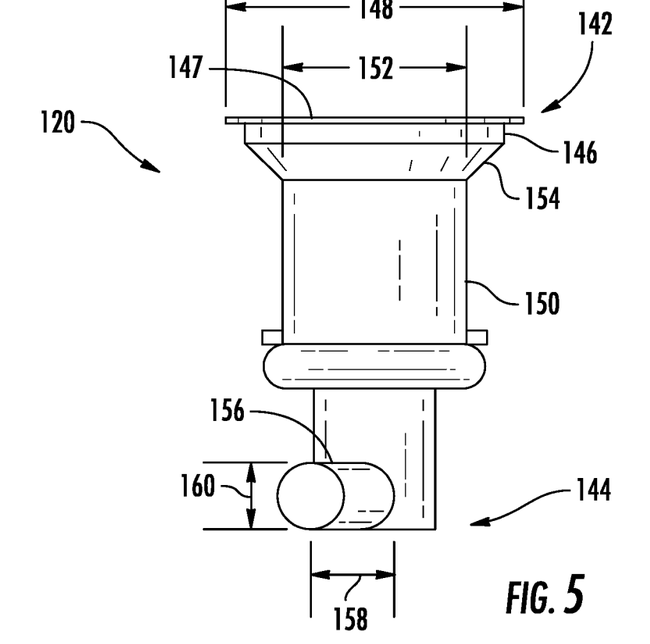
FIG. 5 is a side view of a fastener of the handle assembly of FIG. 1, according to an example embodiment.

Turning now to FIG. 5, the first fastener 120 is shown, according to an exemplary embodiment. The first fastener 120 includes a first fastener end 142 and a second fastener end 144 positioned opposite to the first fastener end 142. A first fastener head 146 having a tool slot 147 is positioned at the first fastener end 142. The tool slot 147 may be shaped to receive a Philips head screwdriver, a slotted screwdriver, a star bit, a hex key, or a square key. In some embodiments, the first fastener head 146 is a hexagonal bolt. In some embodiments, the first fastener head 146 includes a security tool slot, such as a one-way slot, spanner, security star, or triangle. In some embodiments, the tool slot 147 is configured to receive the edge of a coin (e.g., penny, nickel, dime, quarter, etc.) such that the handle 124 may be removed from the door 104 without a dedicated tool. The first fastener head 146 defines a head diameter 148 greater than a diameter of the first hole 108. A first shank 150 extends from the first fastener head 146 and toward the second fastener end 144. The first shank 150 defines a shank diameter 152 being less than both the head diameter 148 and the diameter of the first hole 108. In some embodiments, the first fastener 120 includes a tapered surface 154 that transitions between the first fastener head 146 and the first shank 150. Specifically, the tapered surface 154 defines a frustoconical cross-section that tapers from the head diameter 148 to the shank diameter 152.

A projection 156 (e.g., post, follower arm, etc.) extends radially away from the first shank 150 proximate to the second fastener end 144. In some embodiments, the projection 156 defines a substantially annular body having a circular cross-sectional shape, such as shown in FIG. 5. In some embodiments, the projection 156 defines a cross-sectional shape being different from a circle, such as a hexagon, octagon, share, oval, or similar shape. The projection 156 extends away from the first shank 150 by a projection distance 158, and the projection 156 defines a projection diameter 160. The projection 156 is configured to be received within the first keyway 140 of the handle 124. It should be appreciated that the second fastener 122 is substantially similar to the first fastener 120.

Figure 6:
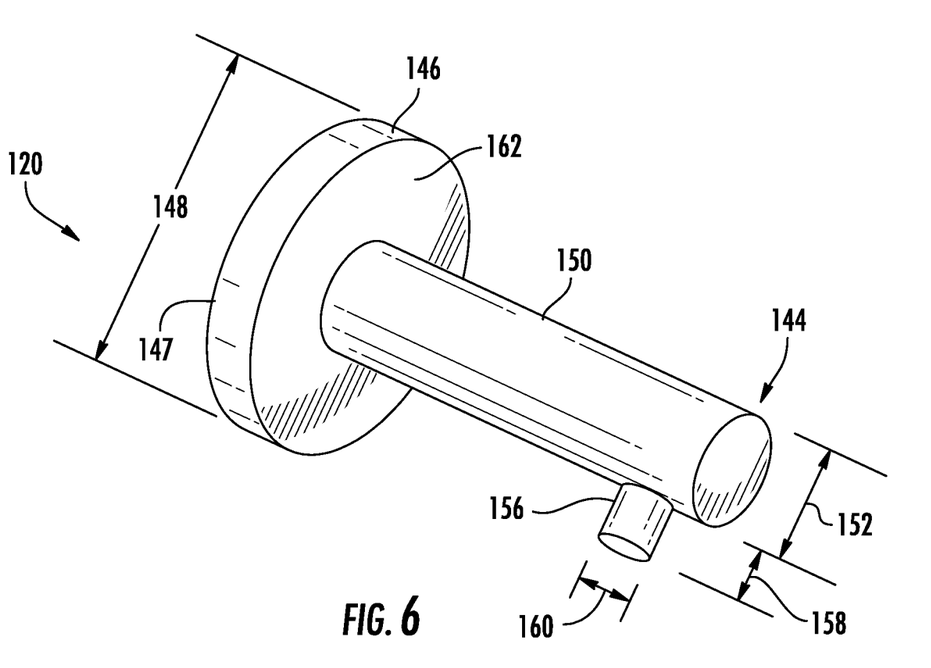
FIG. 6 is a perspective view of a fastener of the handle assembly of FIG. 1, according to an example embodiment.

A first fastener 121 is shown in FIG. 6, according to an example embodiment. The first fastener 121 is similar to the first fastener 120. Accordingly, like numbering is used to designate like parts between the first fastener 120 and the first fastener 121. A difference between the first fastener 120 and the first fastener 121 is that the first fastener 121 does not include the tapered surface 154 extending between the first fastener head 146 and the first shank 150. Another difference between the first fastener 120 and the first fastener 121 is that the first fastener 121 includes a substantially planar surface opposite to the tool slot 147, shown as an engagement surface 162. The first shank 150 extends perpendicularly away from the engagement surface 162. When the first fastener 121 is coupled with the handle 124, the engagement surface 162 faces the substrate 106. In some embodiments, the engagement surface 162 interfaces with the substrate 106 when the first fastener 121 is coupled with the handle 124. In some embodiments, a spacer or washer is positioned between the substrate 106 and the engagement surface 162 when the handle 124 is coupled to the door 104.

Figure 7:
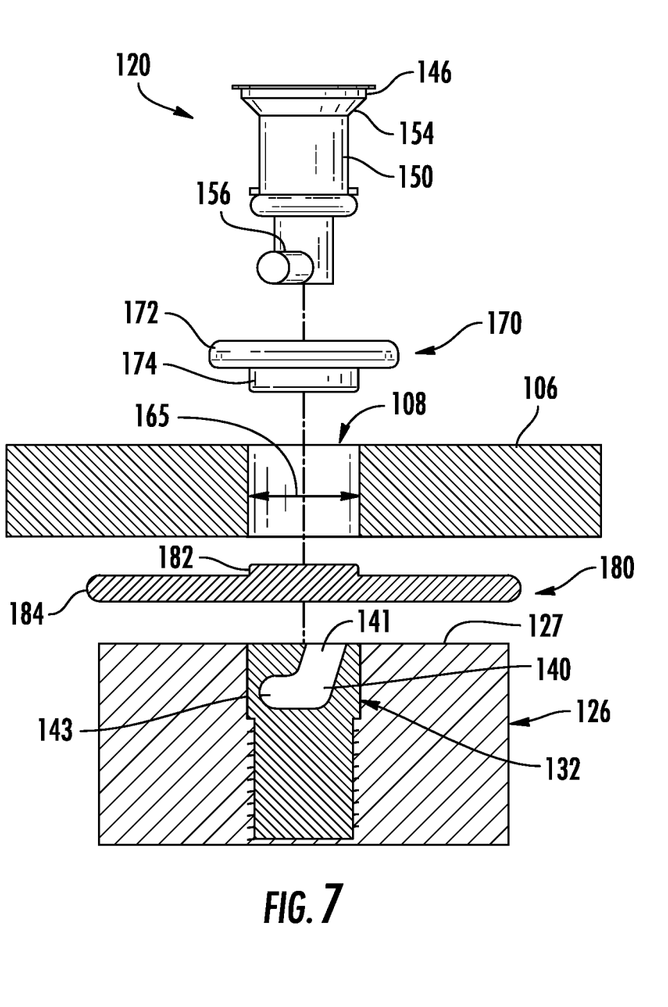
FIG. 7 is a detailed, exploded, cross-sectional view of the handle assembly of FIG. 1, according to an example embodiment.

Turning now to FIG. 7, an exploded, cross-sectional view of the handle assembly 102 is shown. The first fastener 120 extends through the substrate 106 and is received by and coupled to the first receiver 132. Specifically, the first shank 150 extends into the first aperture 138 and the projection 156 is received within the first keyway 140. The first hole 108 defines a first hole diameter 165. The first hole diameter 165 is greater than shank diameter 152 and less than the head diameter 148.

The first receiver 132 is shown positioned within the first boss 126 such that the first receiver 132 is flush with the sole 127. In some embodiments, a central axis of the first boss 126 intersects the first receiver 132. In some embodiments, the first receiver 132 is concentric about the central axis of the first boss 126. The first keyway 140 is shown including a first keyway entry 141 and a first keyway cavity 143. To couple the handle 124 to the substrate, the first fastener 120 is coupled with the first receiver 132. Specifically, the first fastener 120 is inserted through the substrate 106 via the first hole 108 and extended into the first aperture 138 of the first receiver 132. The second fastener end 144 of the first fastener 120 is inserted into the first receiver 132 such that the projection 156 enters the first keyway 140 via the first keyway entry 141. The first fastener 120 is inserted into the first receiver 132 until the projection 156 bottoms out (e.g., engages a substantially parallel edge of the first keyway 140 opposite the sole 127). The first fastener 120 is then turned until the projection 156 is positioned within the first keyway cavity 143. In some embodiments, the first keyway cavity 143 extends upward and toward the sole 127 such that the projection 156, and thus the first fastener 120, translates slightly toward the sole 127 to "lock" or secure the handle 124 to the first fastener 120. In some embodiments, a biasing member (e.g., spring, piston, rubber stop, etc.) is positioned within the first aperture 138 to bias the first fastener 120 in a direction toward the sole 127 when the projection 156 is positioned within the first keyway cavity 143. In some embodiments, the biasing member is a flexible or compressible member positioned between the first fastener 120 and the handle 124. In some embodiments, the biasing member is configured to account for dimensional tolerances of the thickness of the door 104 and the substrate 106. For example, the biasing member may allow for slight movement of the first fastener 120 relative to the sole 127. The biasing member may be a rubber washer, O-ring, or similar member configured to bias the first fastener 120 in a direction toward the sole 127 when the projection 156 is positioned within the first keyway cavity 143. To decouple the first fastener 120 from the first boss 126 and remove the handle 124 from the door 104, the first fastener 120 is rotated in the opposite direction and the first fastener 120 is removed from the first receiver 132. In this manner, the handle 124 can be quickly and easily removed and/or coupled to a door (e.g., the door 104).

A first spacer 170 (e.g., gasket, etc.) is positioned between the first fastener 120 and the substrate 106 to prevent the first fastener 120 from interfacing with the substrate 106. For example, the substrate 106 may be formed of glass and the first fastener 120 may be formed of metal such that the substrate 106 may break, crack, or scratch if the first fastener 120 engages the substrate 106 with too much force (e.g., is over-tightened). In some embodiments, the first spacer 170 is formed of a compressible material, such as rubber, silicone, neoprene, ethylene propylene diene monomer (EPDM), or a similar material. Thus, when the first fastener 120 is coupled to the first boss 126, the first spacer 170 is compressed between the first fastener 120 and the substrate 106.

The first spacer 170 includes a first portion 172 and a second portion 174. The first portion 172 defines an annular body having a diameter greater than the first hole diameter 165. When the first fastener 120 is coupled with the handle 124, the first portion 172 is positioned between the substrate 106 and the first fastener head 146. In some embodiments, the central opening of the first portion 172 defines a frustoconical surface configured to interface with the tapered surface 154 to form a sealing engagement between the first fastener 120 and the first portion 172. In some embodiments, when the first fastener 121 is coupled with the handle 124, the first portion 172 interfaces with the engagement surface 162 and is compressed between the engagement surface 162 and the substrate 106.

The second portion 174 extends axially away from the first portion 172 and defines an outer diameter that is less than the first hole diameter 165. The second portion 174 is configured to be extended into the first hole 108 to prevent the first fastener 120 from interfacing with the substrate 106 (e.g., an inner surface of the first hole 108) when the first fastener 120 is coupled with the handle 124. In some embodiments, the second portion 174 includes an opening that is concentric with the opening of the first portion 172. The central opening of the first spacer 170 may define a frustoconical cross-sectional shape configured to interface with the tapered surface 154 of the first fastener 120.

A second spacer 180 is positioned between the sole 127 and the substrate 106 when the first fastener 120 is coupled with the handle 124. The second spacer 180 is positioned to prevent the sole 127 from interfacing with the substrate 106. For example, the substrate 106 may be formed of glass and the sole 127 may be formed of metal such that the substrate 106 may break, crack, or scratch if the first fastener 120 is over-tightened and the sole 127 is forced (e.g., pressed) into the substrate 106. In some embodiments, the second spacer 180 is formed of a compressible material, such as rubber, silicone, neoprene, ethylene propylene diene monomer (EPDM), or a similar material. Thus, when the first fastener 120 is coupled to the first receiver 132, the second spacer 180 is compressed between the sole 127 of the handle 124 and the substrate 106.

The second spacer 180 is similar to the first spacer 170. A difference between the first spacer 170 and the second spacer 180 is that the second spacer 180 defines a greater diameter than the first spacer 170. The second spacer 180 includes a first portion 182 and a second portion 184. The first portion 182 defines an annular body having a diameter greater than the first hole diameter 165 and a diameter of the first boss 126. When the first fastener 120 is coupled with the handle 124, the first portion 182 is positioned between the substrate 106 and the sole 127.

The second portion 184 extends axially away from the first portion 182 and defines an outer diameter that is less than the first hole diameter 165. The second portion 184 is configured to be extended into the first hole 108 to prevent the first fastener 120 from interfacing with the substrate 106 (e.g., an inner surface of the first hole 108) when the first fastener 120 is coupled with the handle 124. In some embodiments, the second portion 184 includes an opening that is concentric with the opening of the first portion 182. In some embodiments, the second portion 184 behaves like a fixture and extends into the first hole 108 to align the second spacer 180 with the first hole 108.

The first spacer 170 and the second spacer 180 cooperate to provide an axial force to the first fastener 120 to retain the projection 156 within the first keyway cavity 143. The thicknesses and materials of the first spacer 170 and the second spacer 180 may be adjusted to achieve a desirable amount of force applied to the first fastener 120 in a direction away from the first boss 126. In some embodiments, either the first spacer 170 or the second spacer 180, but not both, is made of a compressible material while the other is formed of a substantially firm material.

Figure 8:
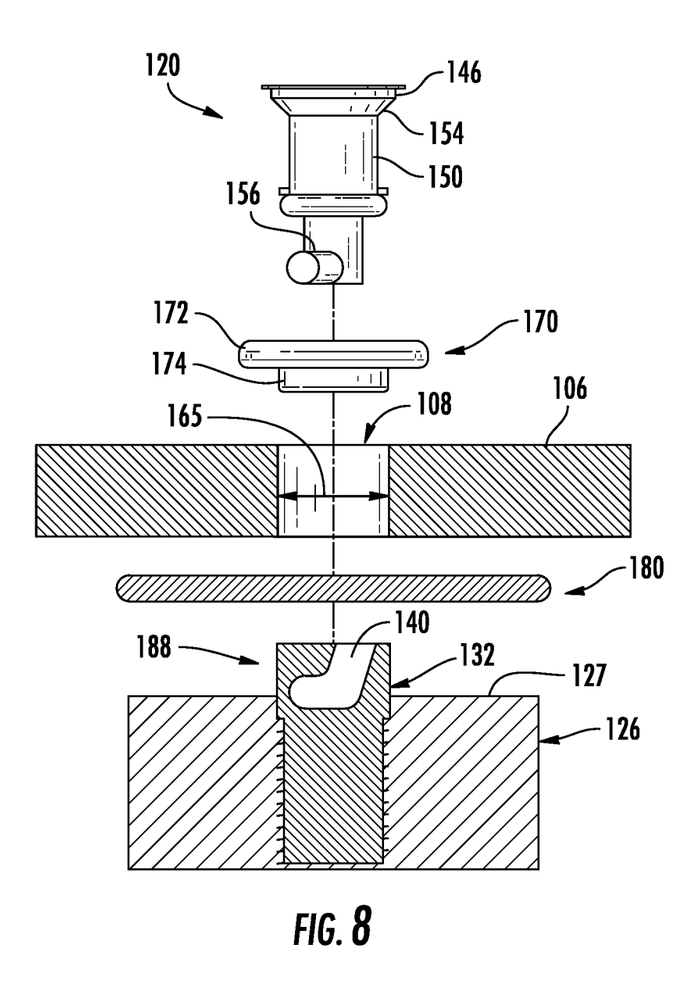
FIG. 8 is a detailed, exploded, cross-sectional view of the handle assembly of FIG. 1, according to an example embodiment.

Turning to FIG. 8, an exploded, cross-sectional view of the handle assembly 102 is shown. The handle assembly 102 shown in FIG. 8 is similar to the handle assembly 102 shown in FIG. 7. A difference between the handle assembly 102 of FIG. 7 and the handle assembly 102 FIG. 8 is that a portion of the first receiver 132, shown as a receiver portion 188, of the handle assembly 102 of FIG. 8 extends above the sole 127 of the first boss 126. When the handle 124 is coupled to the substrate 106, the receiver portion 188 extends into the first hole 108. In some embodiments, the receiver portion 188 also extends through the second spacer 180. In some embodiments, the second spacer 180 does not include the second portion 182. In some embodiments, the second portion 182 of the second spacer 180 surrounds the receiver portion 188 to prevent the receiver portion 188 from interfacing with the inner surface of the first hole 108.

Figure 9:
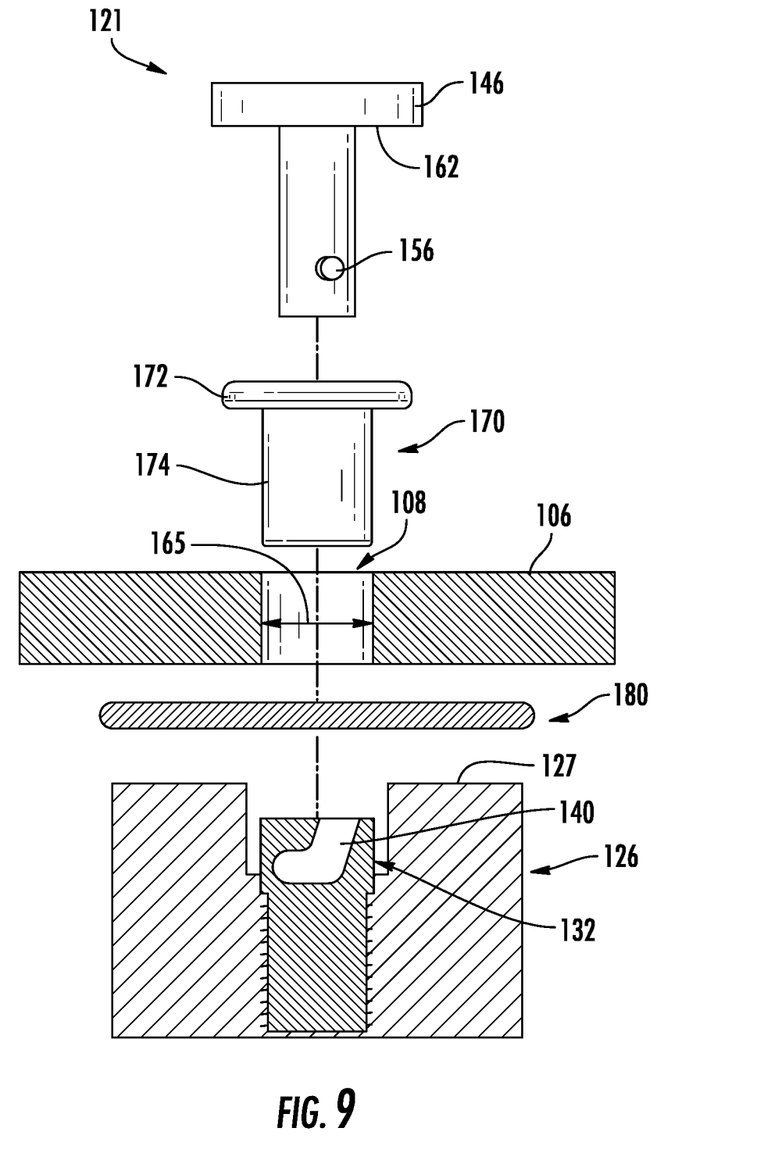
FIG. 9 is a detailed, exploded, cross-sectional view of the handle assembly of FIG. 1, according to an example embodiment.

Turning to FIG. 9, an exploded, cross-sectional view of the handle assembly 102. The handle assembly 102 shown in FIG. 8 is similar to the handle assembly 102 shown in FIG. 7. A difference between the handle assembly 102 of FIG. 7 and the handle assembly 102 FIG. 9 is that the first receiver 132 is positioned beneath the sole 127 of the first boss 126 such that a non-zero distance exists between the sole 127 and the first receiver 132. When the handle 124 is coupled to the substrate 106, the second portion 174 of the first spacer 170 may extend into the first boss 126, beyond the sole 127.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the first fastener 121 of the exemplary embodiment described herein and shown in at least FIGS. 6 and 9 may be incorporated in the handle assembly 102 of the exemplary embodiment described herein and shown in at least FIGS. 1-5, 7, and 8. Specifically, the first fastener 121 may replace either the first fastener 120 or the second fastener 122 of any of the embodiments outlined above in the present disclosure. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A handle assembly for a pivoting door, the handle assembly comprising:
    a handle comprising a first boss and a second boss, the second boss spaced from the first boss, the first boss and second boss coupled to and extending from a same side of the handle;
    a first fastener and a second fastener, the first fastener and the second fastener structured to couple to the handle via the first boss and the second boss, respectively; and
    a first spacer and a second spacer disposed between the first fastener and the handle;
    wherein each of the first fastener and second fastener comprises a shank and a projection, the projection extending radially from the shank, wherein the projection of each of the first fastener and the second fastener is structured to be received within the respective first boss and the second boss; and
    wherein at least one of the first spacer is structured to be received within the first boss, or the second spacer is structured to receive a portion of the first boss.

2. The handle assembly of claim 1, wherein each of the first fastener and the second fastener further comprises a head coupled to the shank;
    wherein the head is disposed a first end and the shank extends from the head to a second end opposite the first end.

3. The handle assembly of claim 2, wherein one of the first fastener and the second fastener comprises a tapered surface disposed between the shank and the head.

4. The handle assembly of claim 2, wherein a diameter of the shank is less than a diameter of the head.

5. The handle assembly of claim 1, wherein the first boss comprises a first receiver and the second boss comprises a second receiver, and wherein the first fastener is received within the first receiver of the first boss and the second fastener is received within the second receiver of the second boss.

6. The handle assembly of claim 5, wherein the first receiver is concentric with a central axis of the first boss and the second receiver is concentric with a central axis of the second boss.

7. The handle assembly of claim 6, wherein the first receiver and the second receiver are coupled to the respective first boss and the second boss.

8. The handle assembly of claim 5, wherein each of the first receiver and the second receiver comprises an aperture and a keyway, the aperture structured to receive the shank and the keyway structured to receive the projection.

9. The handle assembly of claim 1, wherein each of the first boss and the second boss extend orthogonally from the handle.

10. A door assembly for a shower, the door assembly comprising:
    a substrate comprising at least one aperture;
    a handle assembly structured to couple to the substrate, the handle assembly comprising:
        a handle comprising a first boss and a second boss, the second boss spaced from the first boss, the first boss and second boss coupled to and extending from a same side of the handle;
        a first fastener and a second fastener, the first fastener and the second fastener structured to couple to the handle via the first boss and the second boss, respectively; and
        a first spacer and a second spacer disposed between the first fastener and the handle, wherein at least one of the first spacer is structured to be received within the first boss, or the second spacer is structured to receive a portion of the first boss; and
        wherein each of the first fastener and second fastener comprises a shank and a projection, the projection extending radially from the shank, wherein the projection of each of the first fastener and the second fastener is structured to be received within the respective first boss and the second boss.

11. The door assembly of claim 10, wherein the at least one aperture comprises a first aperture and a second aperture, wherein the first fastener is structured to extend at least partially through the first aperture and the second fastener is structured to extend at least partially through the second aperture.

12. The door assembly of claim 11, wherein the first boss comprises a first receiver and the second boss comprises a second receiver, and wherein the first fastener is received within the first receiver of the first boss and the second fastener is received within the second receiver of the second boss.

13. The door assembly of claim 12, wherein the first receiver is structured to extend at least partially through the first aperture.

14. The door assembly of claim 11, wherein the first spacer comprises a first portion and a second portion, wherein the first portion is disposed between the first fastener and the substrate and the second portion is structured to extend through the first aperture and into the first boss.

15. The door assembly of claim 11, wherein the first boss defines a sole, the sole being disposed substantially parallel to the substrate.

16. The door assembly of claim 15, wherein the second spacer is disposed between the sole and the substrate, the second spacer structured to prevent the first fastener from interfacing with the substrate.

17. The door assembly of claim 10, wherein each of the first fastener and the second fastener further comprises a head coupled to the shank;
    wherein the head is disposed a first end and the shank extends from the head to a second end opposite the first end, the projection disposed proximate to the second end.

18. The door assembly of claim 10, wherein a cross-section of each of the first boss and the second boss has a same shape as a cross-section of the handle.

* * * * *